United States Patent [19]
Melnick et al.

[11] Patent Number: 5,100,127
[45] Date of Patent: Mar. 31, 1992

[54] PHYSICAL EXERCISE TREADMILL FOR QUADRUPEDS

[76] Inventors: Dennis M. Melnick, 152 Legionville Rd.; John W. Wahl, 3107 Conway Wallrose Rd., both of Baden, Pa. 15005; Charles S. Melnick, 173 Nursery Rd., Renfrew, Pa. 16053

[21] Appl. No.: 539,233

[22] Filed: Jun. 18, 1990

[51] Int. Cl.⁵ ..................... A63B 23/06; A01K 15/00
[52] U.S. Cl. ..................... 119/29; 198/842; 482/54; 482/6
[58] Field of Search ............ 119/29, 53, 100; 272/69, 70, DIG. 6, DIG. 9; 198/861.1, 864.2, 864.4, 842; 177/245, 132, 52

[56] References Cited

U.S. PATENT DOCUMENTS

| | | | |
|---|---|---|---|
| 3,628,654 | 12/1971 | Haracz | 272/69 X |
| 3,689,066 | 9/1972 | Nagen | 272/69 |
| 3,709,197 | 1/1973 | Moseley | 119/29 |
| 4,095,561 | 6/1978 | Ruetenik | 119/29 |
| 4,205,628 | 6/1980 | Null | 119/29 |
| 4,427,083 | 1/1984 | Muddle | 177/132 |
| 4,708,337 | 11/1987 | Shyu | 272/69 |
| 4,749,181 | 6/1988 | Pittaway et al. | 272/69 |
| 4,819,583 | 4/1989 | Guerra | 119/29 |
| 4,861,021 | 8/1989 | Edwards et al. | 272/70 X |
| 4,898,271 | 2/1990 | Schiessl | 198/464.4 X |
| 4,918,766 | 4/1990 | Leonaggeo, Jr. | 119/29 X |
| 4,928,453 | 5/1990 | Ferkany et al. | 198/464.2 X |
| 4,928,959 | 5/1990 | Bassett et al. | 272/DIG. 6 X |

FOREIGN PATENT DOCUMENTS

| | | | |
|---|---|---|---|
| 2519952 | 11/1985 | Fed. Rep. of Germany | 119/29 |
| 2462179 | 3/1981 | France | 119/29 |
| 2132464 | 7/1984 | United Kingdom | 119/29 |
| 8504073 | 9/1985 | World Int. Prop. O. | 119/29 |
| 8902217 | 3/1989 | World Int. Prop. O. | 119/29 |

Primary Examiner—Richard J. Apley
Assistant Examiner—L. Thomas
Attorney, Agent, or Firm—George C. Atwell

[57] ABSTRACT

For the training, exercise, scientific study, and monitoring of quadrupeds in general, and for particular utilization with thoroughbred racehorses, a movable physical exercise treadmill having a tripartite frame including a first elongated main frame for disposition on a floor surface; a second intermediate inclinable frame positioned on the main frame; and a third conveyor belt supporting frame contained within and supported by the second frame. A system is provided for inclining the second frame, and also for pivoting, along a longitudinal axis, the third frame with respect to the second frame. A generally longitudinal endless belt is slidably supported within the third frame and moves about transversely-extending rollers, and the quadruped's exercise occurs on a topmost movable belt surface. A load support shock-absorbing system located generally within and supported by the third frame and beneath the topmost belt surface includes a slider impact bed with layered, rearrangeable impact absorption members placed thereon. The treadmill includes a vertically-extending mast, removably and pivotally attachable to the second frame. Attached to the mast is a load cell actuating system. The load cell system is interactively attached to the quadruped by a flexible sling. In addition, a separate automatic load sensing system provides, within a belt drive system, a resistive, breaking effect if the quadruped overdrives the belt drive system, both the belt drive system and the automatic load sensing system being components of a motor unit. An impact pressure sensing system registers the amount of pressure the quadruped exerts on the belt during training and exercising sessions. An emergency panic system and a plurality of rail-mounted safety sensor means are safety features that, when actuated, can signal motor unit controlled decelerative shutdown if the quadruped exceeds predetermined lateral and forward-to-rearward safety limits.

43 Claims, 10 Drawing Sheets

PHYSICAL EXERCISE TREADMILL FOR QUADRUPEDS

BACKGROUND OF THE INVENTION

The present invention relates to physical exercise equipment, and more particularly pertains to a movable physical exercise treadmill having a tripartite frame and used generally for quadrupeds, with an emphasis on utilizing it for training, exercising, health monitoring, and the scientific study of thoroughbred racehorses and zoo and laboratory animals.

In the past several decades, countless devices and instruments have been invented for the physical training and exercise and scientific study of animals. In addition, recent decades have seen an increase in benevolent feelings toward, and concern for the decent treatment of, animals kept under human confinement, whether in zoos, game preserves, research laboratories, circuses, or sporting facilities. For instance, the devices and instruments adapted for use in animal studies and research range from operant conditioning Skinner boxes to complex biofeedback machines and experimental breeding programs involving the use of contemporary genetic research.

It is, therefore, unsurprising that the application of sophisticated devices and instruments, in combination with the most up-to-date scientific techniques, has influenced such a sport as thoroughbred horse racing. The training of racehorses has gone far beyond the daily morning jaunt around the dirt track; instead, the training of thoroughbred racehorses involves techniques such as genetic breeding, the most scientific preparation of nutritionally-rich diets, and the most elaborate training regimens One apparatus currently used in the training regimen of racehorses is the exercise treadmill. Modern treadmills can perform a number of tasks related to the training, exercise, scientific study, and health monitoring of thoroughbreds. For example, a properly designed treadmill can improve a horse's racing ability by rigorous training sessions on an adjustable speed or variable speed treadmill. High-speed cameras adjacent the treadmill can photograph a horse's running form; the photographs can then be examined in order to discern defects in the particular horse's running form and to determine methods for improvement.

In addition, electrodes and other sensing devices can be attached to various parts of the horse in order to examine and monitor physical characteristics such as lung and heart capacity and muscle endurance and stamina. Also, thermal photography can be used to evaluate metabolic processes occurring within the horse. Moreover, a properly designed treadmill can alleviate the lethargy and monotony of confinement during inclement weather or the winter season by providing indoor physical exercise approximating outdoor, and in the case of racehorses, even racetrack conditions.

In addition to use with thoroughbred racehorses, exercise treadmills can have other applications. For instance, zoo and laboratory animals can be monitored and studied using exercise treadmills, and periods of confinement indoors to pens and cages can be relieved by stints on an exercise treadmill. Also, exercise treadmills can complement the sophisticated instruments and techniques used in veterinary schools and university research departments. No longer will remote study and examination be required; the animal (preferably a quadruped) can be brought to a veterinary school that has a properly designed exercise treadmill for on-site study and examination.

Indeed, a properly designed exercise treadmill, with provision being made on its structure for adaptation to meet future scientific demands and technological changes, is a valuable acquirement for practical or theoretical purposes in order to enhance the health and productivity of the animals and to increase their longevity. Modern science has indisputably altered the world of man; with devices such as a sophisticated exercise treadmill being applied to the training, study, and research of quadrupeds, the world of nature is unquestionably being changed.

SUMMARY OF THE INVENTION

The present invention comprehends a physical exercise treadmill, and more specifically, comprehends a multi-purpose, movable physical exercise treadmill having a tripartite, interfitting frame structure and an entry end and an exit end. The treadmill is utilized in the exercise, training, health monitoring, and scientific study of quadrupeds, with a particular emphasis on thoroughbred racehorses.

The apparatus of the present invention includes an elongated, rigid conveyor main frame or first frame which is adapted for placement on a stationary surface and which provides foundational support for the component structures of the treadmill. An elongated intermediate inclinable frame or second frame is placed superjacent to the first frame and fastened thereto. Adjacently fitted within, and fastened to, the second frame is a pivoting conveyor frame or third frame. In addition, first and second rollers are rotatably secured at opposite ends of the third frame.

The apparatus of the present invention includes an inclining means for permitting selective inclining of the second frame, the inclining causing the second frame to be displaced from its generally horizontal disposition. Also, the apparatus of the present invention includes a pivoting means to permit selective upward pivoting of the third frame along a longitudinal axis, the pivoting occurring relative to the horizontal disposition of the second frame.

The first frame, the second frame, and the third frame, when disposed in their operative positions as components of the physical exercise treadmill, comprise an interfitting, tripartite frame structure. The interfitting of these components results from the second frame being removably fastenable to the first frame and the third frame being removably fastenable to the second frame. This interfitting, removably fastenable tripartite frame structure is uniquely advantageous for transportation, assembly, disassembly, maintenance, and structural and functional upgrading of the apparatus. Moreover, the inclining means and the pivoting means are independently functioning and selectively controllable when the apparatus is disposed in its operative position.

A pair of oppositely-disposed rollers, denoted as the first roller or drive roller and the second roller or take-up roller, transversely extend between and are rotatably attached to each long side of the third frame. The drive roller is generally located at the entry end and the take-up roller generally located at the exit end of the treadmill. Also, the apparatus includes a plurality of parallel, spaced-apart idler rollers transversely extending therebetween and rotatably secured to each long side of the second frame. The idler rollers are further characterized by having at least one idler roller transversely extending therebetween and being rotatably attached to each long side of the third frame.

An endless belt is removably mounted on the first, second, and idler rollers and is adapted for moving thereabout the rollers and across a load support shock-absorbing means. The load support means includes a slider impact bed, comprised of a plurality of rigid, flat, elongated, removably insertable support pans, disposed within the third frame and beneath the belt surface. Placed superjacent the impact bed are a plurality of layered insertably removable impact absorption members that cushion and absorb the load of the quadruped when it is training and exercising on the belt. A pair of upwardly-extending side rails attached to either long side of the second frame, and extending longitudinally therealong, help to constrain the quadruped to the belt.

The quadruped proceeds upon the belt at the entry end via an entry end ramp hingeably attached to the second frame and exits via an exit end ramp also hingeably attached to the first frame. While the quadruped is on the belt undergoing a training, exercise, or research session, a number of safety features are utilized to protect the quadruped from injury or harm.

A vertically-extending mast, located on the same side as the longitudinal pivoting axis, has at its uppermost end a load cell actuating means secured thereto, the load cell actuating means for constraining the quadruped's lateral and forward-to-rearward movement on the belt and contains elements that can be actuated to signal controlled decelerative belt drive system shutdown if the quadruped's movement exceeds safety limits or if the quadruped should accidentally stumble and fall.

An additional safety feature is the spaced-apart placement on the first frame of an emergency shutdown means which, in the apparatus of the present invention, includes emergency panic buttons which can be actuated in order to communicate immediate belt drive system shutdown if other safety features fail, the quadruped faces imminent harm or injury, or if the quadruped should somehow evade other treadmill safety features.

Yet another safety feature includes a plurality of safety sensor means, with at least one sensor means located on each siderail's inner surface generally near the entry end and the exit end. The safety sensor means can be photoelectric cells that communicate controlled decelerative belt drive system shutdown when a portion of the quadruped intersects a lateral beam or current emanating from the photoelectric cell.

The apparatus of the present invention also includes an automatic load sensing means whereby a resistive, breaking effect is provided if the quadruped overdrives the belt drive system, the automatic load sensing system provided within the belt drive system.

Another object of the apparatus of the present invention is to provide an impact pressure-sensing means in order to, first, determine the downward pressure per unit of surface area being exerted by the quadruped on the belt and impact absorption members and, second, to provide a method, preferably through some type of sensors or electric cells interposed within the impact absorption members, to register and translate the physical data on impact pressure into readable output information.

Other features, objects, and characteristics of the physical exercise treadmill of the present invention will be understood and appreciated from the ensuing detailed description of the presently preferred embodiment of the invention, when read with reference to the accompanying drawings.

DETAILED DESCRIPTION OF THE PREFERRED EMBODIMENT

Figure 1:
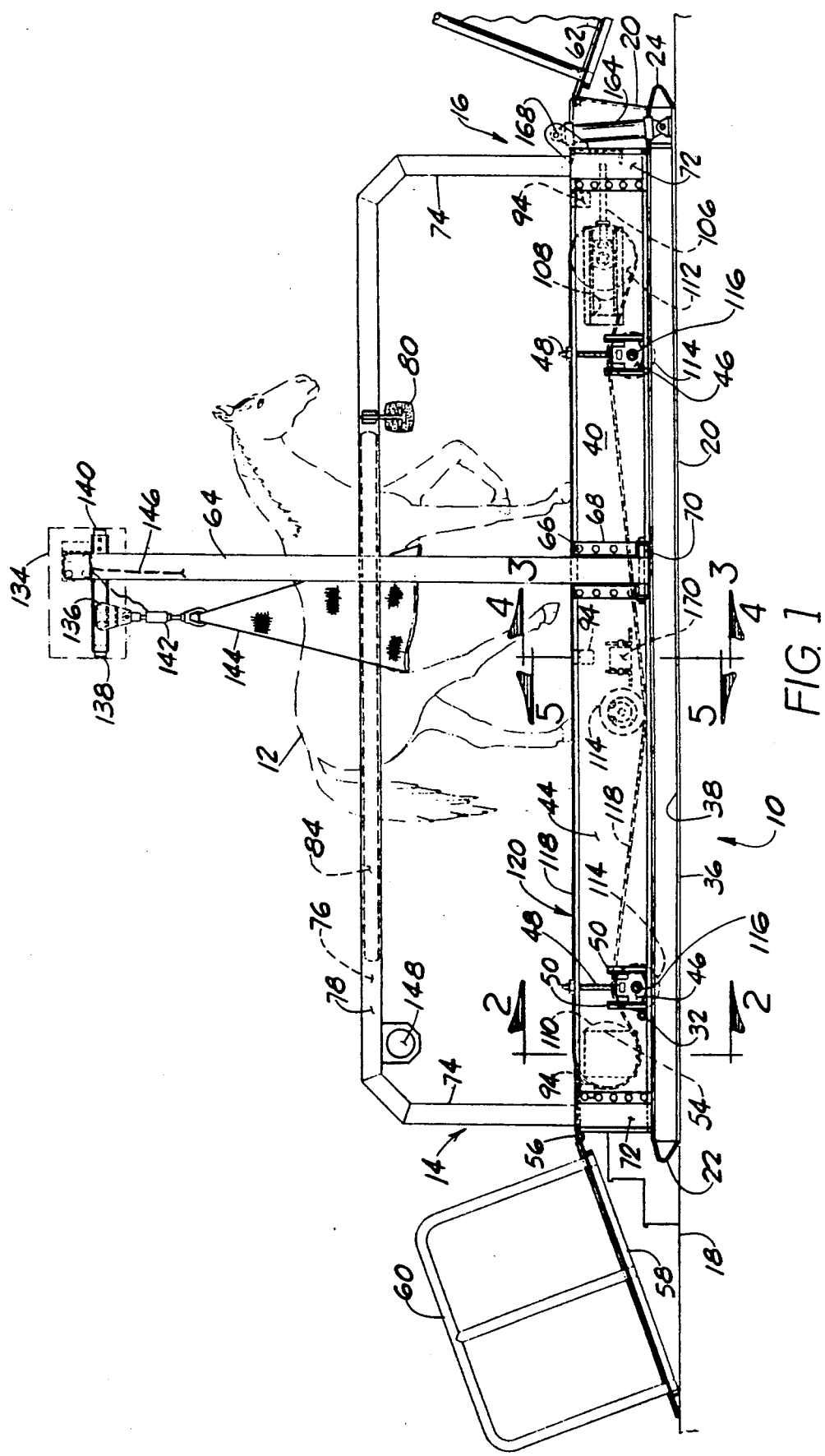
FIG. 1 is a side elevational view of the apparatus of the present invention.

Referring to the drawings, FIG. 1 shows a movable, physical exercise treadmill 10, adapted for the training, exercising, monitoring, and research of quadrupeds, with an emphasis on thoroughbred racehorses, as depicted by a quadruped 12. A primary feature of the treadmill 10 is what may be referred to as the interfitting, tripartite frame structure. The interfitting, tripartite frame structure comprises three separate and distinct frames, has an entry end 14 and an exit end 16, and is generally disposed on a stationary level surface or floor surface 18. Although the preferred embodiment of the apparatus of the present invention is a tripartite frame structure, the treadmill 10 may instead be a unitary frame assembly or structure, and the elements and components included in the tripartite frame structure would be included in the unitary frame assembly or structure.

Figure 2:
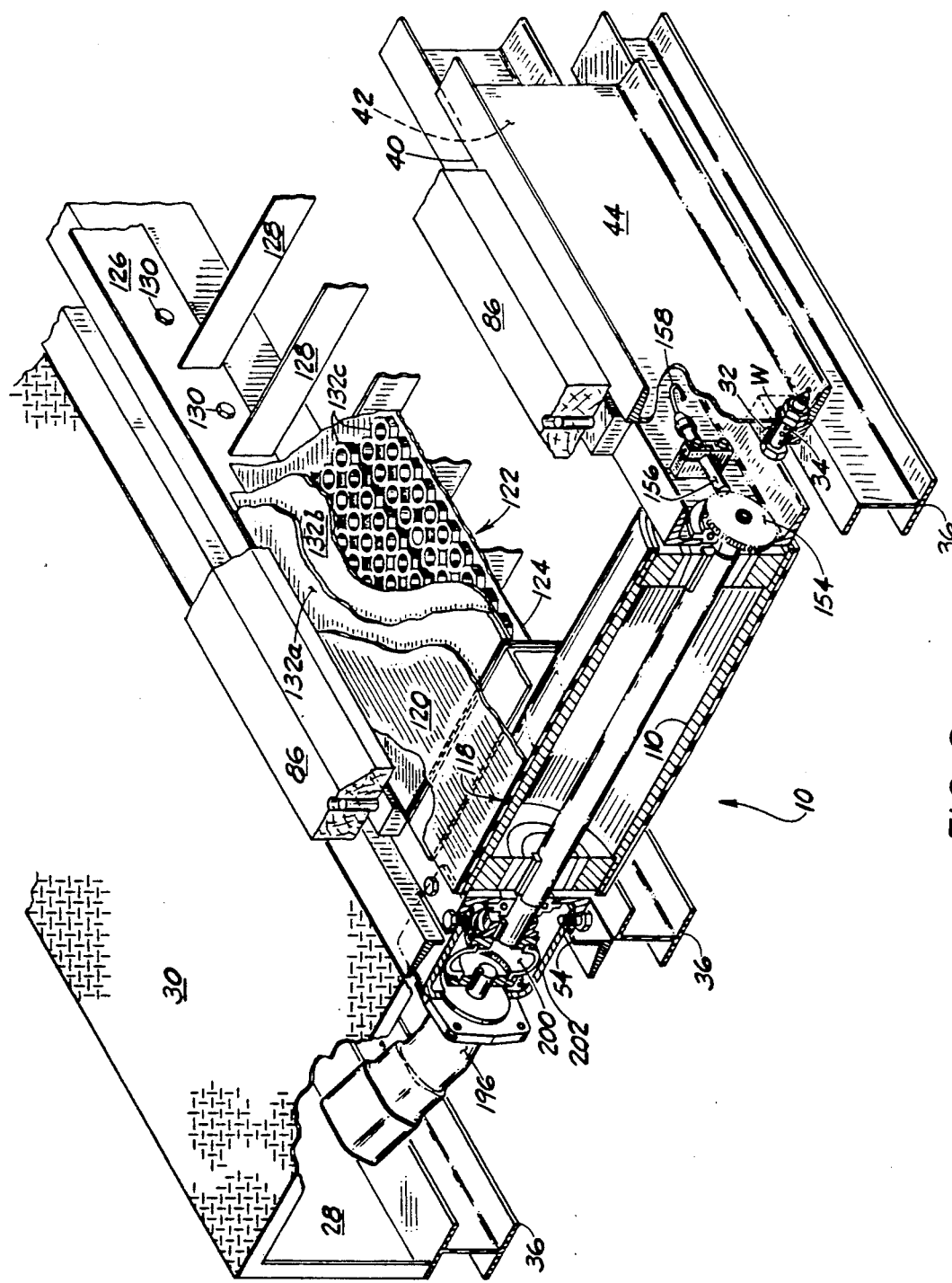
FIG. 2 is a sectional view taken along line 2—2 of the apparatus first shown in FIG. 1, with some components of the apparatus cut away to reveal internal details.

As illustrated in FIGS. 1 and 2, the tripartite frame structure of the treadmill 10 includes a rigid, durable, elongated, generally rectangular-shaped main conveyor frame, hereinafter referred to as the first frame 20, which is adapted for horizontal disposition on a stationary or floor surface 18. The first frame 20 serves as the structural foundation for the majority of the components of the physical exercise treadmill 10.

Figure 3:
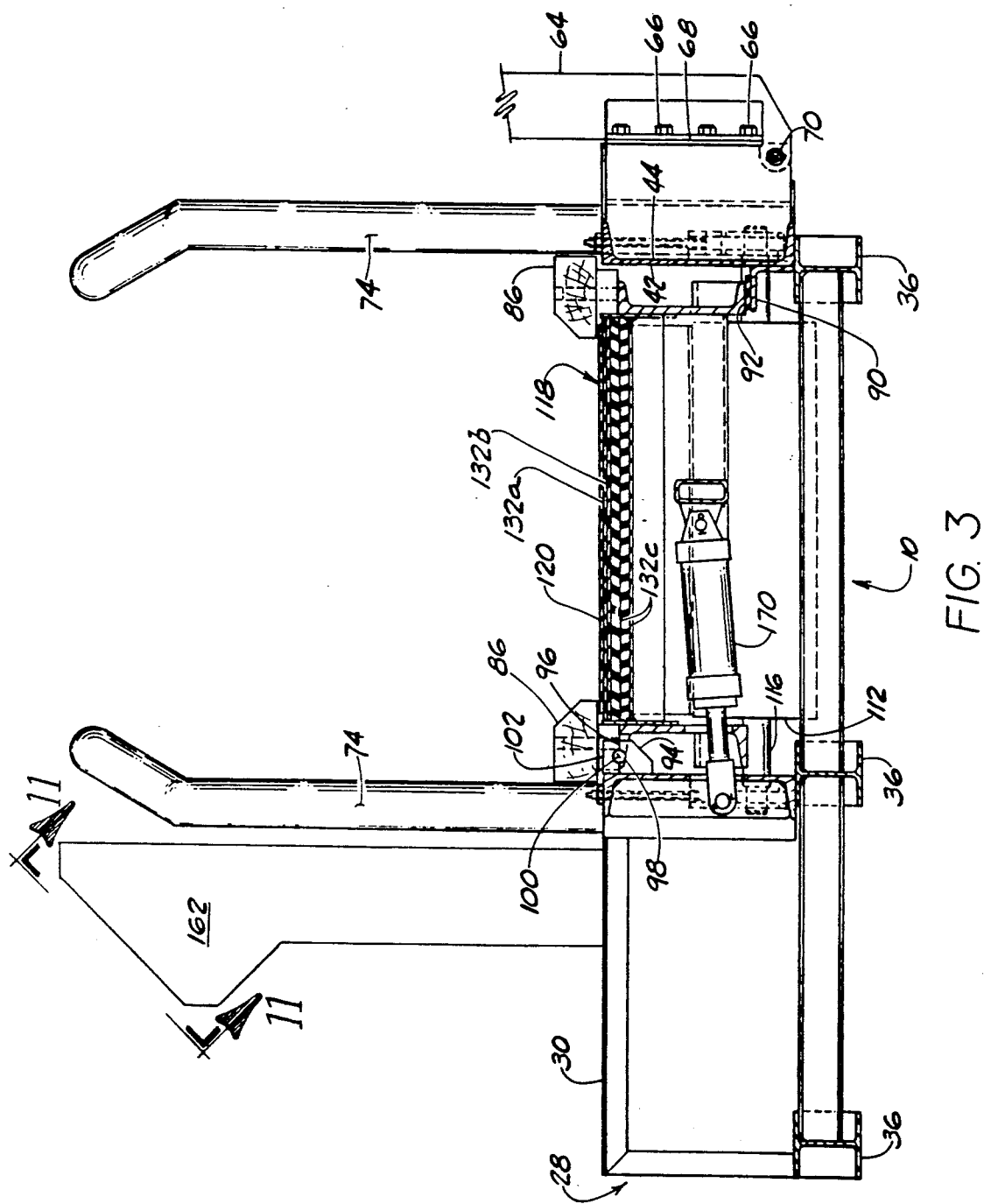
FIG. 3 is a longitudinal sectional view taken along line 3—3 of the apparatus first shown in FIG. 1.
Figure 4:
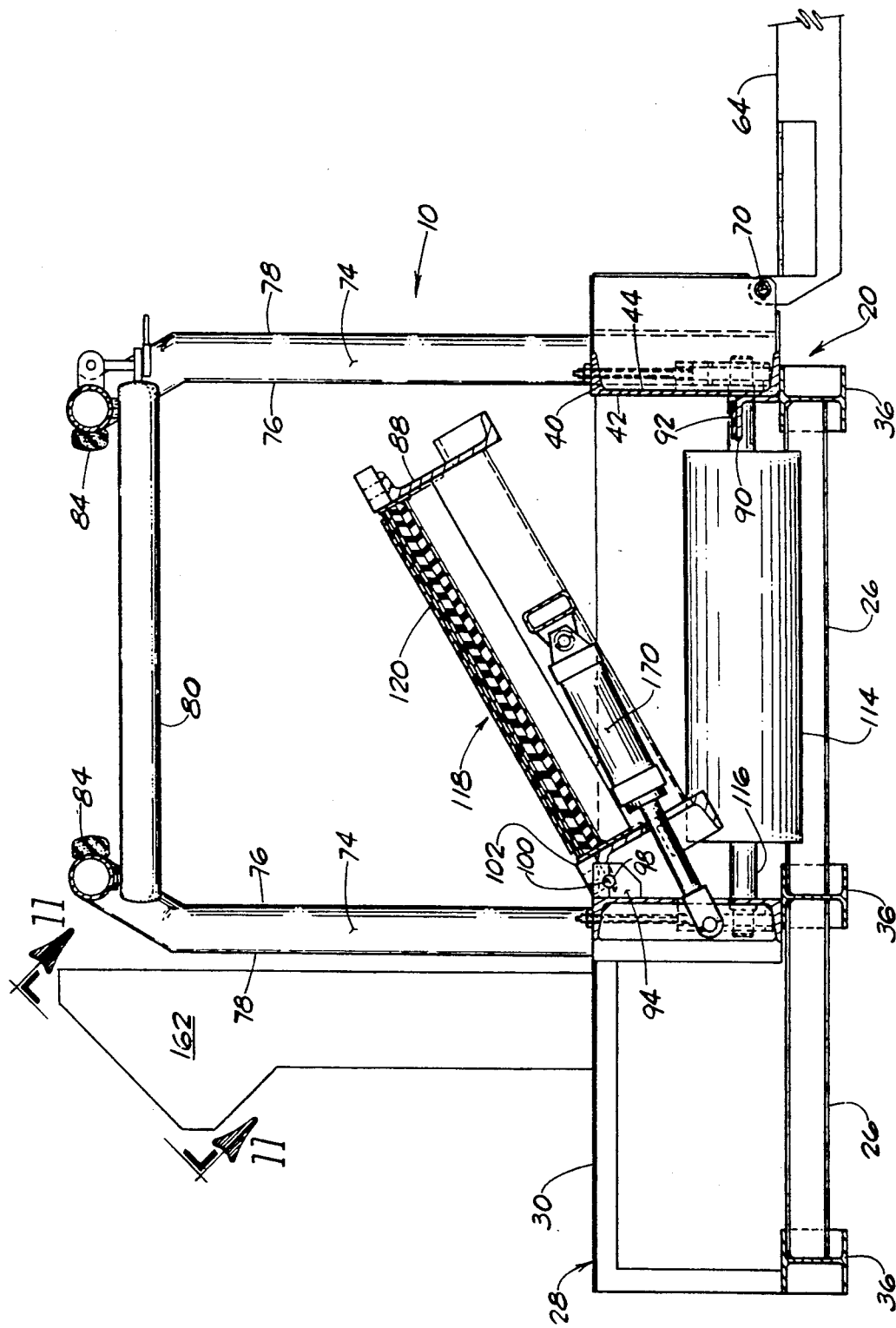
FIG. 4 is a longitudinal sectional view taken along line 4—4 of FIG. 1, showing certain components of the apparatus in their pivoting position as viewed from the entry end of the apparatus.
Figure 5:
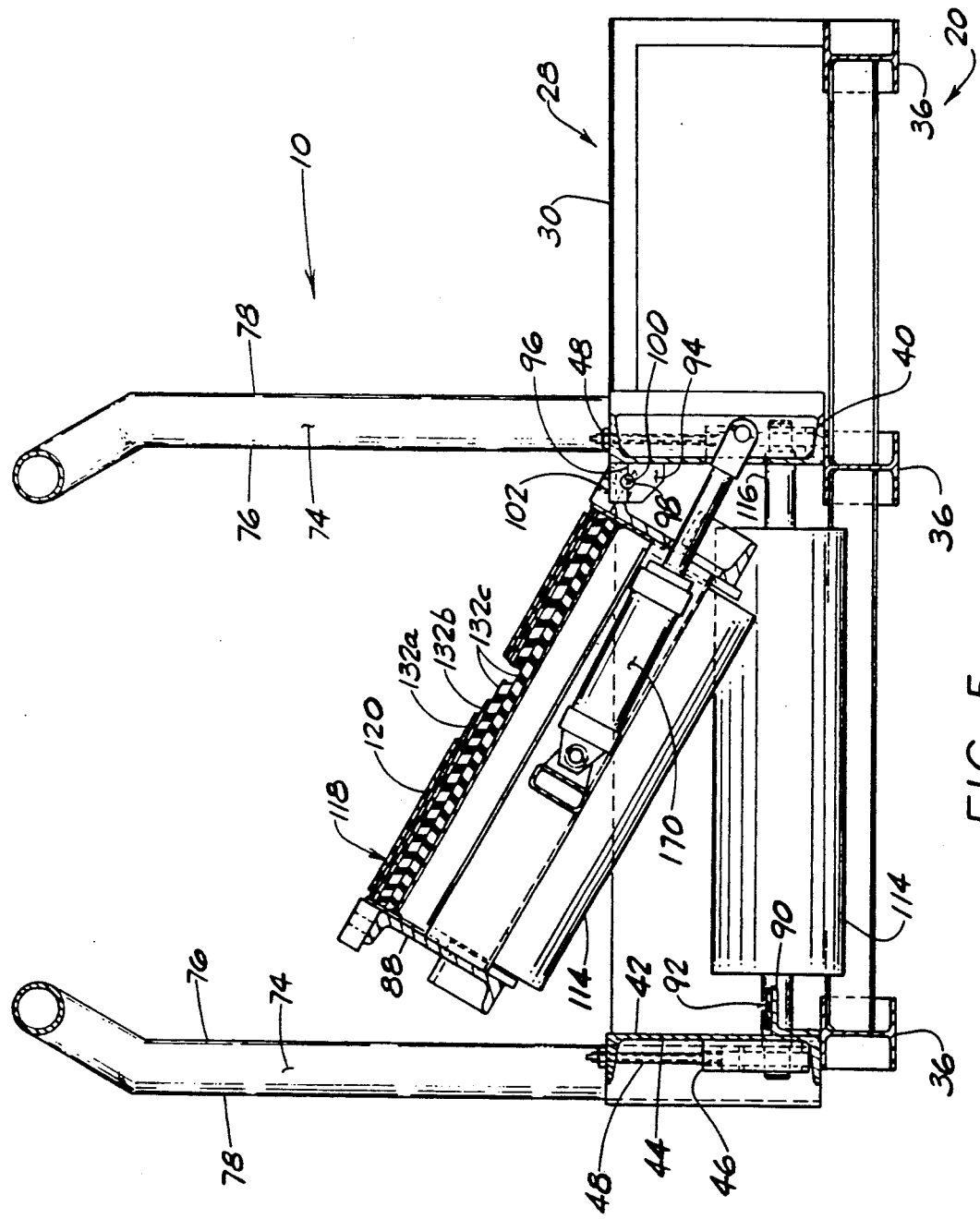
FIG. 5 is a longitudinal sectional view taken along line 5—5 of FIG. 1, showing certain components of the apparatus in their pivoting position as viewed from the exit end of the apparatus.

As illustrated in FIG. 1, the first frame 20 terminates at a pair of oppositely-disposed, integrally-formed, tapered or blunt-nosed frame ends, more specifically denoted by a pair of entry frame ends 22 and a pair of oppositely-disposed exit frame ends 24. The first frame 20 serves to facilitate loading, unloading, and moving of the treadmill 10, and the entry frame end 22 and exit frame end 24 facilitate the skidding of the treadmill 10 as it is placed on a floor surface 18 or moved therefrom. In FIGS. 3, 4, and 5, one of a plurality of transversely-extending first frame supports 26 is shown, the first frame supports 26 adding further stability to the first frame 20 when it is disposed on a floor surface 18. The first frame 20 also serves as a support and foundation for an elongated, rectangular-shaped, belt drive system housing 28. The belt drive system housing 28 runs substantially the length of the first frame 20 and is attached to what may be called the spectator side of the treadmill 10. The belt drive system housing 28 has a top housing surface 30 which serves as a spectator and control and monitoring platform. The top housing surface 30 is also elongated and parallel to the treadmill 10. The housing surface 30 is used for immediately adjacent observation of the quadruped 12 during a training and exercise session. As illustrated in FIGS. 1, 2, 6, and 7, secured to the first frame 20 and generally near the entry end 14, are a pair of oppositely-disposed, axially-aligned first frame inclining blocks 32. Each inclining block 32 includes a removably insertable first frame inclining bolt 34 for insertion through a bore (not shown) centrally located on each inclining block 32. The purpose of each inclining block 32 and inclining bolt 34 will be hereinafter further described. Also, as shown in FIGS. 2 through 5, the first frame 20 includes three rigid, elongated first frame members 36 positioned on the floor surface 18 and terminating in the entry frame ends 22 and exit frame ends 24 FIG. 1 shows one first frame member 36 and an oppositely-disposed entry frame end 22 and an exit frame end 24. Furthermore, at least two of the first frame members 36 have an integrally-formed, outwardly-extending flange 38 which will be hereinafter further described.

Figure 7:
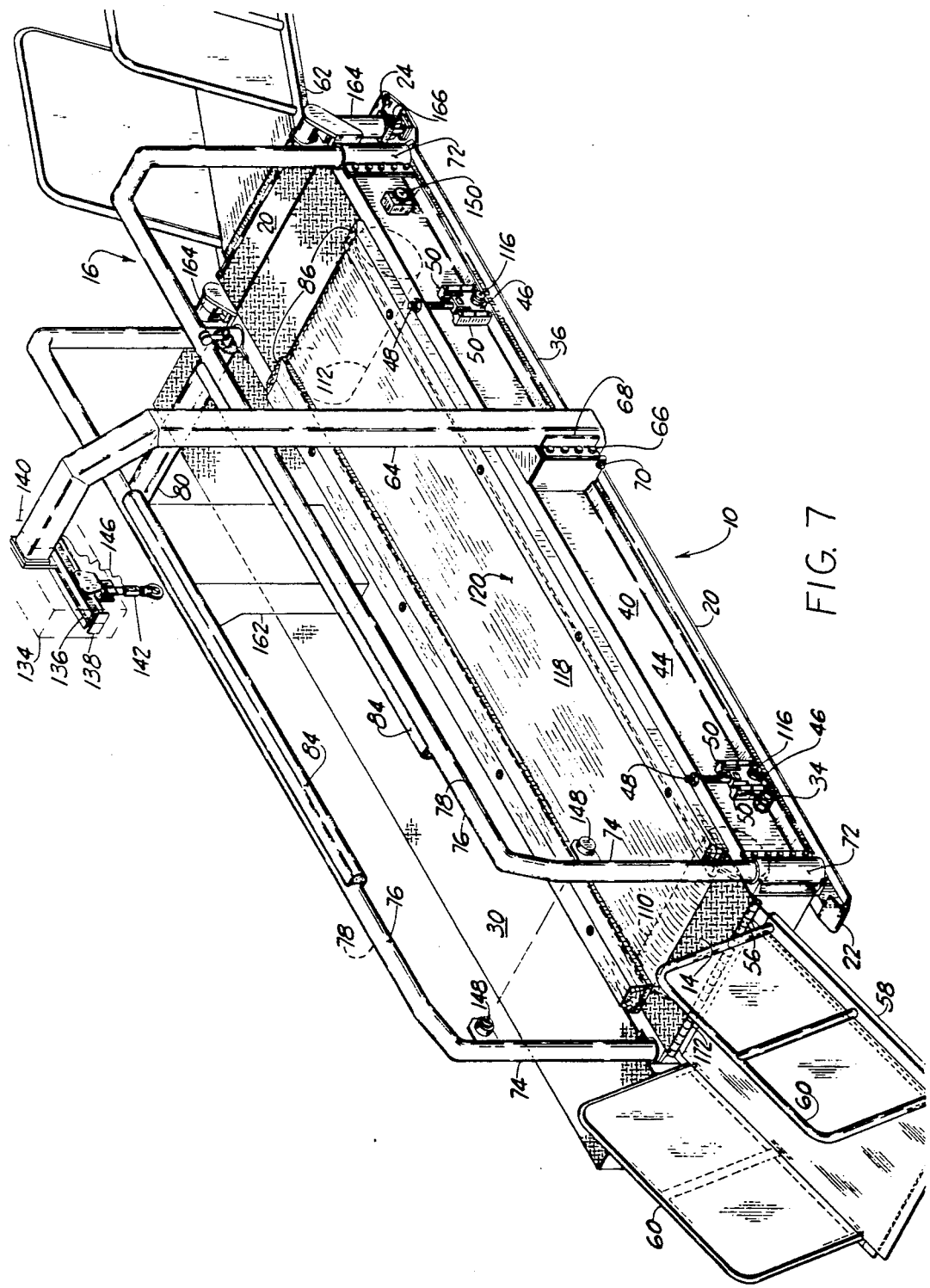
FIG. 7 is a side perspective view of the apparatus first shown in FIG. 1.

When the treadmill 10 is disposed in its operative position, as shown in FIGS. 1 and 7, an intermediate inclinable frame, hereinafter referred to as the second frame 40, is placed superjacent the first frame 20. The second frame 40 is a rigid, elongated, generally rectangular-shaped structure adapted for selective inclining relative to the horizontal disposition of the first frame 20. As shown in FIG. 2, when the second frame 40 is placed in its operative position relative to the first frame 20, the second frame 40 sits outboard of and adjacent to the first frame inclining blocks 32. In addition, when the second frame 40 is in its normal horizontal disposition, it rests substantially on each outwardly-extending flange 38 of the two first frame members 36. The second frame 40 further includes an interior second frame surface 42 and an exterior second frame surface 44, with an inclining block hole (not shown) located on both elongated sides of the second frame 40. When the second frame 40 is disposed in its operative position relative to the normally horizontal disposition of the first frame 20, each inclining block hole (not shown) on the second frame 40 is axially aligned with each centrally-located bore (not shown) on each inclining block 32 and, thus, each inclining bolt 34 can be fastened through the bore for securement and also for facilitating selective inclining of the second frame 40 relative to the first frame 20.

As shown in FIGS. 1 and 7, a pair of spaced-apart vertical take-up members 46 are secured to each lengthwise side of the exterior second frame surface 44. Each take-up member 46, as shown in FIGS. 1 and 7, includes an elongated vertical adjustment screw 48, the topmost part of which projects above the second frame 40, and adjacent and lateral to the screw 48, on either side, is a vertical take-up guide 50. The bottommost portion of each screw 48 is threadably interfitted to an adjustment idler member 52, and the function of the take-up members 46 shall be hereinafter further described. As indicated in FIG. 1, a rectangular-shaped clearance hole 54 is provided on the second frame 40 near the entry end 14, the purpose of which shall be further described hereinafter.

Figure 6:
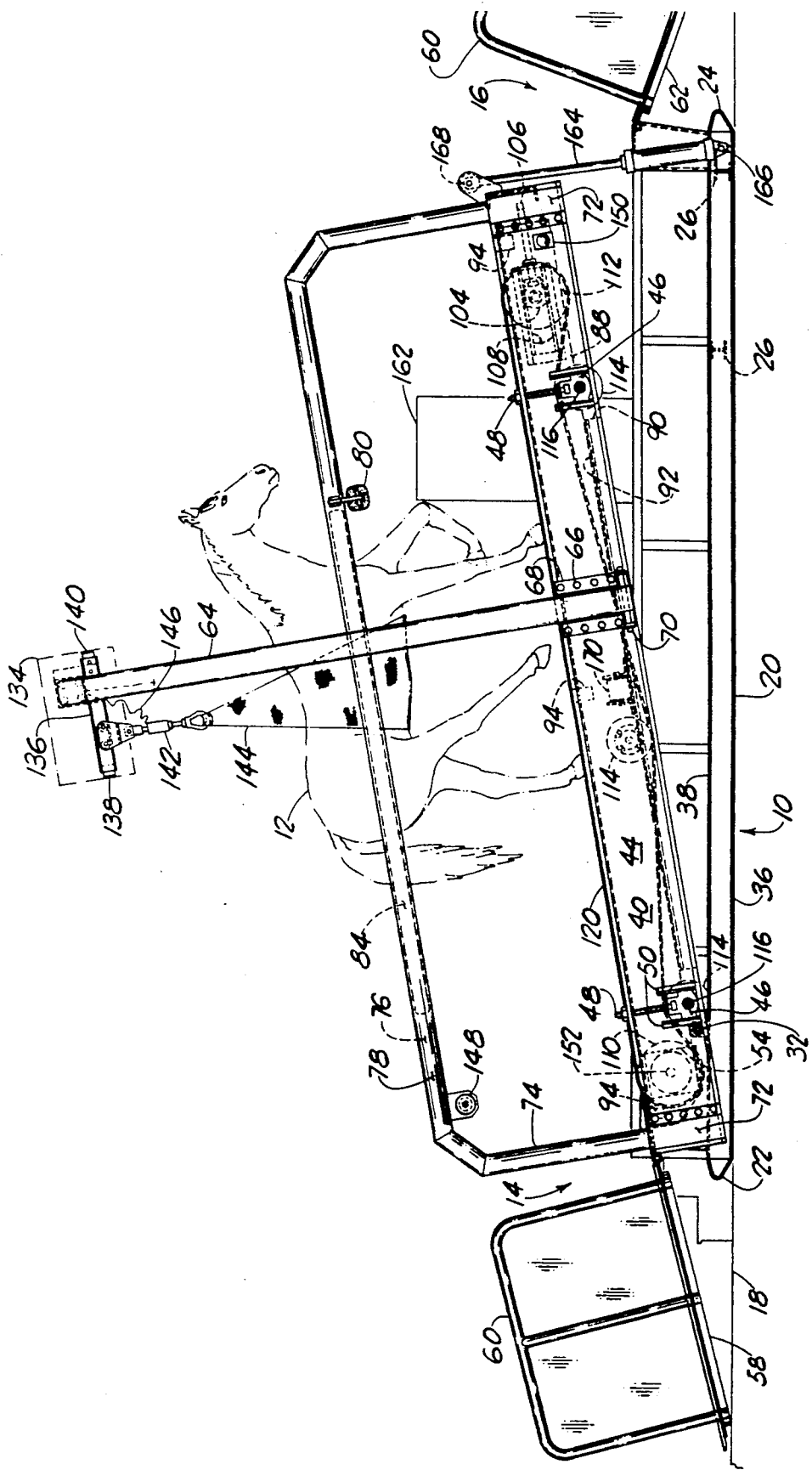
FIG. 6 is a side elevational view of the apparatus first shown in FIG. 1, with certain components of the apparatus in an inclining position.

Located on what would be the short or width end of the second frame 40, as shown in FIGS. 1, 6, and 7, and at the entry end 14, are a plurality of spaced-apart, axially-aligned, integrally-attached lugs 56. A removably hingeable entry end ramp 58, with oppositely-disposed, parallel, vertically-extending entry ramp rails 60, has spaced-apart, axially-aligned ramp rings (not shown) integrally-attached to a bottom edge and, when the treadmill 10 is disposed in its operative position, the ramp rings are adjacently interposed for axial alignment therebetween the lugs 56 located on the second frame 40. Securement of the entry ramp 58 to the lugs 56 of the second frame 40 is by means of a rigid bar or rod (not shown) inserted through the axially-aligned ramp rings and lugs 56. The treadmill also includes a removably hingeable exit end ramp 62. The exit end ramp 62 shown in FIGS. 1, 6, and 7 is also adapted for removable hingeable attachment on the upper extension of the first frame 20. The second frame 40 also has lateral crossbraces (not shown) extending between and attached to the long sides of the second frame 40 for additional support.

FIGS. 1, 6, and 7 illustrate a pivotally-removably-attachable, vertically-extending mast 64 which is secured to the exterior second frame surface 44 and located opposite of the operator or spectator side of the treadmill 10. As shown in FIGS. 1, 3, 6, and 7, the mast 64 is secured to the second frame 40 by means of a plurality of mast bolts 66 threadably inserted through a mast bracket 68 and into the second frame 40 for rigid securement thereon. The mast 64 is also adapted to be horizontally laid upon the floor surface 18 for reasons hereinafter further described. To achieve this purpose, the mast 64 is also secured by means of an insertably attachable mast pivot 70. When it is necessary to lay the mast 64 on the ground, the mast bolts 66 are removed in order to permit the mast 64 to pivot downward to the floor surface 18 by means of the insertably attachable mast pivot 70.

As illustrated in FIG. 1 and FIGS. 3 through 7, the second frame 40 includes a plurality of second frame sockets 72, with one frame socket 72 located at each corner of the second frame 40. Inserted into the frame sockets 72 are a pair of elongated, oppositely-disposed, vertically-extending side rails 74, each side rail 74 having an inner surface 76 and an outer surface 78, and adapted for being removably insertable in the frame sockets 72. The side rails 74 are adapted to laterally confine the racehorse 12 during a training and exercise session and have, as safety features, a pair of adjacently-positioned padded abutments 80 and 82. The first abutment 80 is located forwardly of and the second abutment 82 is located rearwardly of the racehorse 12 and restrict forward-to-rearward movement. As shown in FIG. 5, attached on each inner surface 76 of each side rail 74 is an elongated attached side support cushion 84 for preventing harm or injury to the quadruped if it should bump or fall against one of the side rails 74. In addition, as illustrated in FIGS. 2 and 3, a pair of oppositely-disposed, longitudinally-extending kick plates 86 are superposed on a third frame (hereinafter fully described) for removable securement thereon and are located laterally inward of the side rails 74. The kick plates 86 deflect the quadruped's legs, hooves. paws, etc., if they should happen to laterally overstep the safety limits of the treadmill 10.

Disposed within the second frame 40, as illustrated in FIGS. 2 through 5, is a rigid, elongated, pivoting frame, hereinafter referred to as the third frame 88, which is adapted to be pivoted, along a longitudinal axis, relative to the second frame 40. The generally rectangular-shaped third frame 88 is adapted to be adjacently interfitted within the second frame 40 and is capable of removable insertion therein. When the third frame 88 is in its normal operative disposition relative to the second frame 40, a long side of the third frame 88, opposite the housing 28, rests upon a second frame conveyor support 90. As shown in FIGS. 3, 4, and 5, the conveyor support 90 is elongated and integrally attached to the interior second frame surface 42 and has an elongated resilient support pad 92 affixed to its upper surface for additional support of the third frame 88 when it is disposed in its normally horizontal disposition relative to the second frame 40.

On the lengthwise side of the second frame 40, adjacent the belt drive housing 28, there are attached a plurality of removably securable, spaced-apart, axially-aligned, second frame pivoting blocks 94, one of which is shown in FIGS. 3, 4, and 5. More specifically, the second frame pivoting blocks 94 are removably mountable to the interior second frame surface 42 and are adapted for facilitating the pivoting of the third frame 88 relative to the horizontal disposition of the second frame 40. In addition, each pivoting block 94 has an upper block surface 96, further defined by an elongated, concave-shaped recessed groove 98 formed thereon and arranged in longitudinal axial alignment. Adapted for longitudinal placement within each recessed groove 98 of each pivoting block 94 is an elongated third frame pivoting pin 100. In the treadmill 10 of the present invention, the number of pivoting pins 100 is equal to the number of pivoting blocks 94. Each pivoting pin 100 is mounted to the third frame 88 with a gap between the pin 100 and the third frame 88 to permit axial rotation of the pin 100. When the third frame 88 is disposed in its normal operative position adjacently within the second frame 40, each pivoting pin 100 picks up and is set within each corresponding recessed groove 98 of each pivoting block 94. For further securement, each pivoting block 94 has secured thereto a retainer cap 102, each retainer cap 102 covering each upper block surface 96 and each pivoting pin 100. Although each cap 102 is secured to each pivoting block 94, the corresponding pivoting pin 100 is capable of axial rotation within the groove 98 of the block 94. The allowance for axial rotation of the pin 100 is essential for the pivoting of the third frame 88.

In addition, the apparatus of the present invention has, as illustrated in FIGS. 1 and 6, a pair of oppositely-disposed, horizontal take-up members 104 located outboard of and secured to the third frame 88, the function of which shall be hereinafter more fully described. Each take-up member 104 includes a horizontal adjusting screw 106 and a pair of laterally-disposed horizontal adjustment guides 108. Moreover, the take-up members 104 are located near the exit end 16 of the treadmill 10.

FIGS. 1, 2, 6, and 7, show a main drive or first roller 110 and a take-up or second roller 112. The first roller 110 is located adjacent the entry end 14 of the treadmill 10, and transversely extends between and is rotatably secured to each long side of the third frame 88. The second roller 112 is located at the exit end 16 of the treadmill 10, transversely extending between and rotatably attached to each long side of the third frame 88. In addition, both the first roller 110 and the second roller 112 are crowned. A crowned roller, such as the rollers of the apparatus of the present invention, has a central diameter that is slightly larger than either of its two edges. Because the surface rotational speed of a crowned roller is greater at its central diameter than at its edges, the belt is pulled to the center of the roller and thus the tendency of the belt to slide toward either edge is hindered. In addition, both the first roller 110 and the second roller 112 are rubber-lagged. The rubber lagging facilitates the movement of the belt thereabout each roller 110 and 112 by reducing belt friction. The apparatus of the present invention also includes a plurality of staggered, parallel, spaced-apart idler rollers 114 positioned transverse to the second frame 40, one of which is illustrated in FIG. 1 and FIGS. 3 through 7. The idler rollers 114, one of which is shown in FIGS. 4 and 5, extend transverse and between the second frame 40 and also include a centrally-positioned idler axle 116 which extends between and is rotatably secured to the second frame 40. The idler axles 116 are also rotatably engaged and attached to the take-up members 46. In addition, at least one idler roller 114 transversely extends between and is rotatably secured to the third frame 88. This idler roller is also centrally located on the third frame 88.

As illustrated in FIGS. 1 through 7, an endless belt 118 is supported on the first roller 110, the second roller 112, and the idler rollers 114, and is adapted for generally longitudinal movement thereabout the aforesaid rollers. Furthermore, the endless belt 118 is removably mountable from the first roller 110, the second roller 112, and the idler rollers 114 after upward pivoting of the third frame 88 occurs. The endless belt 118 is additionally defined by a topmost belt surface 120 extending substantially the full length and width of the third frame 88 and upon which the racehorse 12 is positioned or placed for a training and exercise session.

In order to cushion and absorb the downward pressure exerted by the racehorse 12 during a training and exercise session, a load support shock-absorbing means has been utilized in the apparatus of the present invention. The load support shock-absorbing means is located within and supported by the third frame 88 and includes a slider impact bed 122, illustrated in FIGS. 2 and 7, located beneath the topmost belt surface 120, and disposed within the third frame 88 and between the first roller 110 and the second roller 112. The slider impact bed 122 further comprises a plurality of removably insertable, adjacently-aligned, rigid support pans 124 which are adapted for placement within the third frame 88. As shown in FIG. 2, each support pan 124 has oppositely-disposed longitudinal members 126, and extending between and attached to the longitudinal members 126 are a plurality of support pan transverse crosspieces 128. Each support pan 124 has a plurality of spaced-apart support pan mounting holes (not shown) located on each longitudinal member 126, the support pan mounting holes line up with third frame mounting holes (not shown). In order to provide removable securement of the support pans 124 to the third frame 88, support pan mounting bolts 130 are inserted through the support pan mounting holes and third frame mounting holes and can also be removed when disassembly and maintenance is required on the treadmill 10.

FIG. 2 shows, in the area between the support pans 124 and the topmost belt surface 120, a plurality of elongated, contiguously-stacked impact absorption members 132a, 132b, and 132c (collectively referred to as impact absorption members 132). The impact absorption members 132 actually absorb and cushion the downward pressure of, for example, the hooves of the trotting or running racehorse 12, on the topmost belt surface 120 during a training and exercise session on the treadmill 10. A number of different materials can be inserted in the area between the support pans 124 and the topmost belt surface 120 in order to cushion and absorb the downward pressure and striking of the hooves of the racehorse 12 upon the topmost belt surface 120, however, it has been discovered that one characteristic the impact absorption members 132 should include is the capability of layered rearrangeable placement superjacent the support pans 124 and beneath the topmost belt surface 120. This permits experimentation in order to find the right combination of resilient and/or absorption material best suited for cushioning and absorbing the downward pressure of a trotting, running, or exercising quadruped. In the apparatus of the present invention, a rubber pad 132a, a resilient composite material 132b, and two honeycombed rubber members 132c serve as the impact absorption members 132. In addition, to further enhance the cushioning and absorbing qualities, the honeycombed rubber members 132c are placed contiguous and offsetting one to another. For maximum effectiveness and also safety, the impact absorption members 132 should extend the full length of the slider impact bed 122 when it is disposed in its operative position. Many materials other than those mentioned could serve as impact absorption members 132, such as materials going by the tradename of FABEROL, BENELEX, or HMW. The paramount goal is to find the right combination of impact absorption members 132 that both cushion and absorb the downwardly directed pressure of an exercising quadruped and also, in the case of the racehorse 12, that simulate racetrack conditions.

The apparatus of the present invention includes a number of safety and monitoring features to protect the racehorse 12 from harm or injury and also to evaluate a range of physical characteristics and attributes of the particular quadruped. Attached at the uppermost end of the mast 64 is a load cell actuating means which includes an overload support enclosure 134, as illustrated in FIGS. 1, 6, and 7. Within the enclosure 134, which serves as much as a decorative as well as a functional purpose, is an elongated overload switch support 136 which is adapted to permit reciprocal, longitudinal, traversible movement within a fixed range, the fixed range further defined by a first range end 138 and a second range end 140. Depending from and attached to the overload switch support 136 is an overload switch 142 adapted for transversible longitudinal or linear movement on the overload switch support 136. A connective flexible sling 144 is attached at a first strap end to the exercising racehorse 12 and at a second strap end to the overload switch 142. The load cell actuating means is adapted for determining and registering the position of the quadruped on the belt in order to shut down the belt drive system (hereinafter more fully described) when the quadruped exceeds predetermined lateral and forward-to-rearward safety limits. An electrical connection wire 146 runs from the overload switch 142 to the belt drive system in order to communicate belt drive system shutdown.

During a training and exercise session, the sling 144 is firmly attached around the neck of the racehorse 12 and the overload switch support 136 allows some freedom of movement of the racehorse 12. However, if the racehorse 12 should stumble and fall sideways, or suddenly lurch too far forward or backward, the traversible linear movement of the overload switch 142 on the overload switch support 136 will come in contact with either the first range end 138 or the second range end 140, as the overload switch support 136 allows for only a few feet of linear movement for the overload switch 142. When the overload switch 142 comes in contact with either of the range ends 138 or 140, the range ends actuate an electrical signal to shut down the belt drive system. In other words, when the overload switch 142 is moving linearly between either of the range ends, the circuit is closed and no signal is produced or actuated to commence belt drive system shutdown. If the racehorse 12 should stumble or fall, the mass of the falling quadruped would force the reciprocally-moving overload switch 142 to come into contact with either range end, depending on the exact direction and angle of the falling or stumbling racehorse. When contact of either range end is made, the circuit will be opened up, thus, actuating a signal for shutting down the belt drive system.

Ideally, some type of controlled and decelerative belt drive system shutdown is desired because if the shutdown is abrupt, and the racehorse 12 is exercising or running on the topmost belt surface 120 at a fair amount of speed, his momentum will carry him forward and perhaps even throw him off the topmost belt surface 120 if there is a sudden shutdown of the belt drive system, such shutdown immediately stopping the first roller 110 and, consequently, the movement of the endless belt 118. In the apparatus of the present invention, provision has been made for this potential problem in the belt drive system that will rectify this potentially dangerous situation.

Although in the apparatus of the present invention, as illustrated in FIGS. 1, 6, and 7, the mast 64 provides an overhead support means for mounting the overload switch support 136 and the overload switch 142 and also, indirectly, the connective flexible sling 144, there are other means of mounting these components. For example, a wooden or steel beam or girder, or any type of portable overhead support structure spanning the treadmill yet close enough to the racehorse 12 for attaching some type of strap or harness, can be utilized. As long as the overload switch 142 is supported over the treadmill 10 and has some type of means, perhaps rail, roller, or slidable means, to reciprocally and longitudinally move within oppositely-disposed ends or contacts, the ends or contacts being components of the overload switch support 136, the load cell actuating means can be mounted on or within a variety of overhead support structures, and successfully utilized.

A safety sensor means, illustrated in FIGS. 1, 6, and 7, is included in the apparatus of the present invention. More specifically, the sensor means is a photocell 148 located on at least one side rail adjacent the entry end 14 or the exit end 16. The photocells 148 can be placed on the angled corners of each side rail 74 or, in order to accommodate the side support cushions 84 which run the length of each rail 74 and are attached to each rail's inner surface 76, the photocells 148 can be dependingly attached to at least one side rail 74 adjacent the entry end 14 or the exit end 16. The photocell 148 produces a laterally-emanating signal which would be transverse and horizontal to the generally longitudinal movement of the topmost belt surface 120. If the racehorse 12 should, for whatever reason, lurch or stumble too far forward or backward, perhaps because the connective flexible sling 144 becomes loosened or one or both of the padded abutments 80 and 82 have fallen off or were not put on when the treadmill 10 was assembled, the racehorse 12 would be in danger of stepping off the treadmill 10 and being injured. The moving of the belt 118 would add further momentum to the movement of and would increase the chances of injury to the racehorse 12. If the racehorse 12 were to lurch forward or rearward, it would intersect or cut the laterally-emanating signal generated by the photocell 148 thereby actuating the belt drive system. In addition, an individual or observer standing adjacent the entry end 14 or exit end 16 of the treadmill 10 could cut the light signal emanating from the photocell 148 himself or herself, causing the shutdown of the belt drive system.

Yet another safety feature for shutting down the belt drive system, if the racehorse 12 has exceeded lateral or forward-to-rearward safety limits on the belt 118 during a training and exercise session, includes an emergency shutdown means located outboard and on the first frame 20, as illustrated in FIGS. 1, 6, and 7. More specifically, the emergency shutdown means is a plurality of spaced-apart panic buttons 150, with at least one panic button 150 located on the first frame 20 and adjacent the entry end 14 or the exit end 16. If the observer or spectator notices that the racehorse 12 is beginning to have a problem while exercising on the belt 118, or its lateral or forward-to-rearward movement may cause it imminent injury or harm, the observer or spectator can press one of these panic buttons 150 in order to actuate belt drive system shutdown. The panic buttons 150 can be outwardly-projecting and marked or colored as such, or they can be enclosed within some type of rectangular or cylinder element in order to prevent accidental pressing or bumping against by a spectator or observer.

The apparatus of the present invention includes a number of components or systems which facilitate the monitoring and study of the racehorse 12 when it is exercising on the treadmill 10, and also has components and systems to monitor the various mechanical functions related to the first roller 110, the belt 118, and the belt drive system. One component employed in the apparatus of the present invention is an impact pressure sensing means (not shown) which is adapted for measuring and registering the pressure per unit of surface area on the belt 118 or, specifically, the topmost belt surface 120 that receives the downward pressure of the exercising racehorse 12. Although not shown in the figures, the impact pressure sensing means is interposed among the impact absorption members 132. The impact pressure sensing means may include a plurality of sensors of a transducer type attached to the impact absorption member 132 immediately subjacent the topmost belt surface 120. The sensors would be electrically attached to some type of output device whereby the downward pressure of the racehorse 12 is measured, registered, and translated into readable data.

In addition, it is contemplated that the sensors or some other type of impact receiving device are placed so that the hooves, paws, etc., of any type of quadruped striking any part of the topmost belt surface 120 will cause the resulting pressure to register on a corresponding and subjacently-placed sensor. For each unit of surface area on the topmost belt surface 120 there would be a corresponding and subjacently-placed sensor to register the pressure applied to that unit of area. The more sensors that are placed subjacent the topmost belt surface 120, and the closer they are placed together—preferably, they should cover the entire impact absorption member 132, whether it be a mat, pad, or some other type of resilient composite material—the more accurately they will measure and register the downwardly-directed pressure exerted on the topmost belt surface 120 by the exercising racehorse 12.

This impact pressure sensing means somewhat resembles the pixel effect that produces the multicolored graphics on a CRT screen whereby the screen is divided into hundreds, or perhaps thousands, of contiguous units, with each unit corresponding and receiving a certain type of output for display. The impact pressure sensing means, in effect, uses a pixel-type effect in which a hoof, paw, etc., striking any part of the topmost belt surface 120 generates, in the corresponding subjacently located microprocessor, some type of output. The value of the impact pressure sensing means, such as the one contemplated for employment in the apparatus of the present invention, is that it can detect, measure, and register a range of variations in the running form of the racehorse 12. A situation may occur wherein the racehorse has been injured but manifests no external signs; however, the impact pressure being registered and measured while the racehorse 12 is training and exercising on the topmost belt surface 120 may be slightly different from the impact pressure previously measured when the health and racing form of the racehorse 12 have been verified by trainers or veterinarians. For example, if the racehorse is favoring one leg over another, and such favoring is indiscernible to trainers or spectators, it will be measured and registered by the sensors, and the output data can be compared to previous output data gathered during a healthy exercise and training session. A comparison of the data will reveal deviations and alterations and will inform the trainer or observer of problems involving the health of the racehorse 12.

As illustrated in FIG. 2, another monitoring system, this one specifically for the first roller 110, is a belt speed detection means for determining the rotational belt speed of the first roller 110 by registering its revolutions during a given time unit. More specifically, the belt speed detection means is located outboard of the third frame 88 and in rotational registration with the first roller axle 152. The belt speed detection means includes a cylindrical roller detection disk 154 that is rotatably attached to the axle 152, the disk 154 being located outboard of the third frame 88. When the treadmill 10 is disposed in its operative position, the rotation of the first roller axle 152 causes the rotatably attached roller detection disk 154 to also rotate. As the disk 154 rotates, an adjacently located surface speed sensor 156 picks up or registers some type of pulse, such as a magnetic pulse, emanating from the disk 154 at a predetermined interval. A sensor connection wire 158 attached to the surface speed sensor 156 transmits the information to some type of an output device whereby the data can be read or printed out. Thus, the rotational speed of the first roller 110 can be determined in revolutions per minute or revolutions per second, and a precise form of monitoring one characteristic of the first roller 110 is accomplished.

Figure 11:
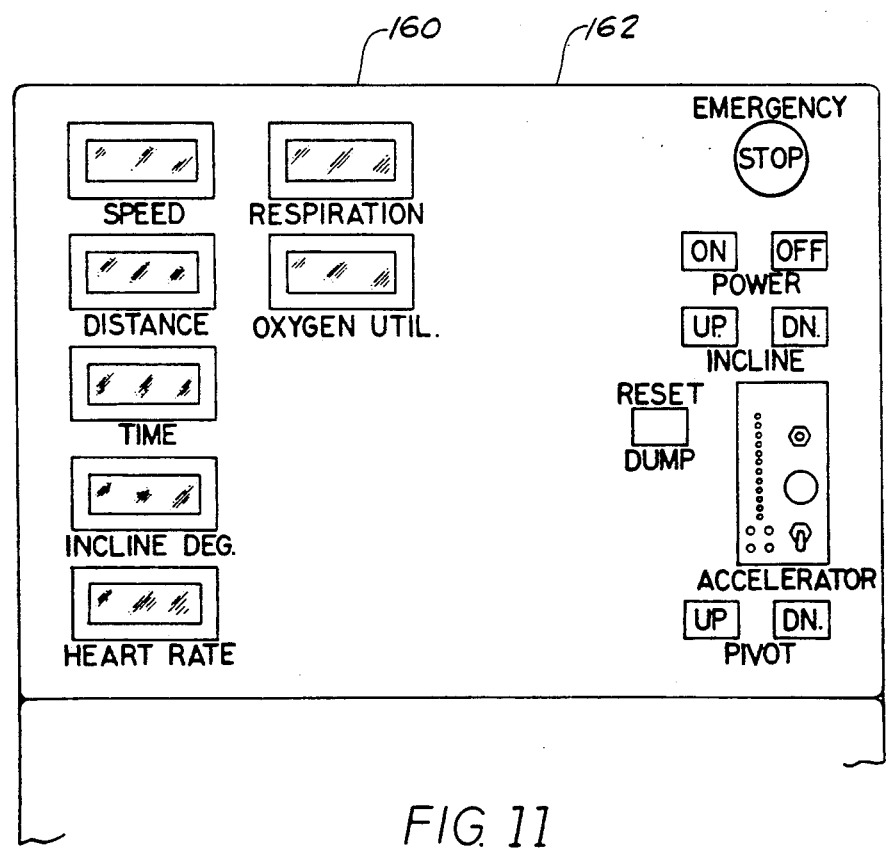
FIG. 11 is a fragmentary isometric sectional view of the belt scraper of the apparatus first shown in FIG. 1.

The apparatus of the present invention also includes a means for monitoring certain physical characteristics of the belt 118 and the racehorse 12 during a training and exercise session. As shown in FIG. 11, the monitoring means includes a display monitor 160, which can be attached to the mast 164 or it can be remotely placed from the treadmill 10 and electrically attached thereto. In the apparatus of the present invention, the display monitor 160 is adapted for registering and translating physical characteristics of the belt 118 and the racehorse 12 into visually discernible indicia, the physical characteristics of the belt 118 being measured are the speed of the belt in miles per hour, the distance the belt travels in miles, and the elapsed time the belt was run in minutes during a particular training and exercise session; the physical characteristic of the racehorse 12 registered by the display monitor is the heart rate of the racehorse 12 when it is exercising on the topmost belt surface 120 of the treadmill 10.

In addition, as illustrated in FIGS. 11, a control panel 162 is located on the belt drive housing 28 and opposite the mast 64. The control panel 162 houses or encloses all of the manually-manipulable switches and controls that operate the various components of the treadmill 10. Among the switches and controls (not shown) located on or within the control panel 162 are the on switch, off switch, variable speed control, reset monitor, reset dump valve, frame incline, frame pivot, and emergency stop switch. The control panel 162 may also be located in an adjacent room whereby, for example, electrical wires may be connected from the various switches to the various components of the treadmill 10. This remote location of the control panel 162 would eliminate the possible distraction to the racehorse 12 of having an operator or trainer standing adjacent the exercising racehorse 12 while operating the control panel 162.

As illustrated in FIGS. 1, 6, and 7, the apparatus of the present invention includes both an inclining means and a pivoting means. Both the inclining means and the pivoting means are selectively actuated and separately controllable components within the treadmill 10. The inclining means permits selective inclining or elevation of the inclinable second frame 40 relative to the normally horizontal and level disposition of the first frame 20. More specifically, the inclining means includes a pair of oppositely-disposed hydraulic inclining cylinders 164, each cylinder 164 having a first cylinder end 166 attached to the exit end 16 of the first frame 20 and a second cylinder end 168 attached to the second frame 40. Each cylinder 164 can be selectively actuated during a training and exercise session in order to increase the stress on the racehorse 12 to measure the resulting physical and metabolic changes. Also, during inclining, the racehorse 12 is more vigorously exercised. The inclining, as shown more specifically in FIG. 6, attains its highest point at the exit end 16, and, unlike the removably hingeable ramp 60 located at the entry end 14, the exit end ramp 62 is hingeably attached to the first frame 20 and is not pivoted or pulled upward by the inclining second frame 40. The pivoting blocks 32 serve as the pivot points for the second frame 40 when it is selectively inclined with respect to the horizontal disposition of the first frame 20. As illustrated in FIG. 6, which shows the second frame 40 inclined with respect to the first frame 20, the entry ramp 60 is only slightly displaced from its normal disposition because of its hingeable attachment to the second frame 40. The auxiliary drive unit which provides the power for the hydraulic inclining cylinders 164 will be hereinafter further described.

The apparatus of the present invention also includes a pivoting means for selective pivoting of the third frame 88 along a longitudinal axis relative to the normally horizontal disposition of the second frame 40. As illustrated in FIGS. 3, 4, and 5, a hydraulic pivoting cylinder 170, hingeably attached to the second frame 40 and extending transverse to all three frames, is adapted for upward pivoting of the third frame 88. The primary reason for upward selective pivoting of the third frame 88 is to remove the belt 118 for inspection, maintenance, and replacement.

A unique feature of the apparatus of the present invention is that the capability of the third frame 88 to be selectively upwardly pivoted allows removal and replacement of the belt 118 in a short time and with little difficulty. In order to remove the belt 118, the mast bolts 66 must be removed and the vertically-extending mast 64 must be downwardly pivoted by the mast pivot 70 until it is horizontal with and in contact with the floor surface 18 to avoid obstructing the quick and easy removal of the belt 118 from all the rollers. After the mast 64 has been laid upon the ground, the third frame 88 has been upwardly pivoted, and any necessary adjustments to the vertical take-up members 46 or the horizontal take-up members 104 have been made, the belt 118 can then be removed for inspection, maintenance or replacement. The steps are simply reversed when the belt 118 must be put back on the rollers.

After the belt 118 has been placed back on and about the rollers 110, 112, and 114, the proper belt wrap and tension must be attained. The placement of the rollers 110, 112, and 114 facilitates the achievement of the proper and desired belt wrap and tension. As illustrated in FIGS. 1, 6, and 7, the centrally-located idler roller 114 transversely extends between and is rotatably secured to each long side of the third frame 88. When the belt 118 is first placed back on the rollers, it has some slack because it extends about the first roller 110, the second roller 112, and the centrally-located idler roller 114. The two other idler rollers 114 are not yet in contact with the belt 118 as they are stationarily secured to the second frame 40, each one located inward of the first roller 110 and the second roller 112, respectively. As the third frame 88 is being pivoted, the belt 118 makes contact with each of these idler rollers 114, but there is still some slack in the belt 118. This additional slack is taken up by the centrally-located idler roller 114 acting to clamp down on that portion of the belt 118 directly beneath it. If additional positioning of the belt 118 is required, then the vertical take-up members 46 and the horizontal take-up members 104 can be selectively adjusted to achieve the proper and desired belt wrap and tension.

It is to be expected that during the training and exercise session, or several consecutive training and exercise sessions, dirt, debris, and quadruped excrement will steadily accumulate on the belt 118, hindering the smooth and efficient running of the belt 118 about the rollers. In order to rectify this undesirable condition, a means to wipe the belt 118 is contemplated on the apparatus of the present invention. More specifically, the belt wipe means may include a belt scraper as shown in FIG. 1 which would transversely extend between and be secured to the lengthwise sides of the second frame 40. The belt scraper 171a would be parallel with the rollers and located adjacent to either the inside or outside of one of the idler rollers 114. Furthermore, the belt scraper, or belt scrapers, would be located adjacent but not contiguous with the belt 118. When the apparatus would be disposed in its operative position, with the belt 118 moving about the rollers, it would pass substantially close to the belt scraper thereby causing the accumulated dirt and debris to be scraped off.

Figure 10:
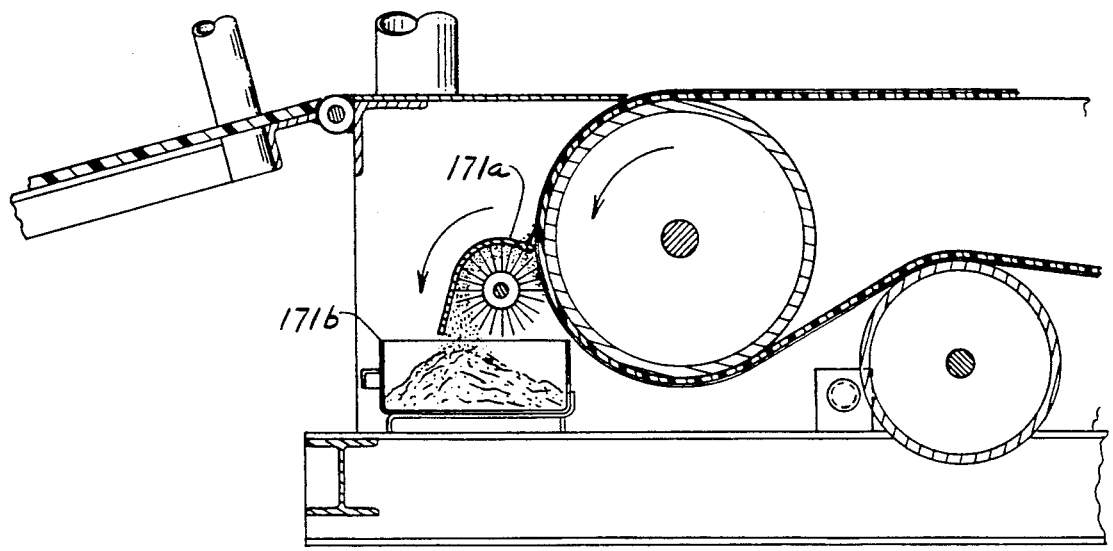
FIG. 10 is a fragmentary isometric sectional view of the belt scraper of the apparatus first shown in FIG. 1.

In addition, some type of means or structure must be provided to catch or contain the excrement deposited on the belt 118 by the exercising quadruped. In the apparatus of the present invention, it is contemplated that some type of catch pan 171b also shown in FIG. 10 will be removably inserted in the area beneath the first roller 110 and horizontal with the generally horizontal disposition of the first frame 20. The catch pan may be rectangular-shaped and should fit within the first frame 20. Access to the catch pan and the first roller 110 may be by various means.

One method contemplated by the apparatus of the present invention is through the employment or utilization of a cover plate. The cover plate (not shown) would be attachably removable and located generally at the entry end 14 in order to substantially cover the first roller 110 when the cover plate is disposed in its operative position. Along one of the long edges that is transverse to the second frame 40, the cover plate would include spaced-apart, axially-aligned cover plate insertion rings. When the cover plate is disposed in its operative position, the insertion rings would be axially and contiguously interposed between the lugs 56 that are integrally attached to the second frame 40. Since the cover plate would extend across and above the first roller 110 when placed in its operative position, the insertion rings would be interposed with the lugs 56 the full width of the second frame 40. Some type of bar or rod would then be inserted through the insertion rings and the lugs 56, and pivoting movement for the cover plate would be attained.

In order to observe the first roller 110 or check the catch pan, the cover plate would be upwardly pivoted away from its normal disposition of horizontally and adjacently covering the first roller 110. Also, the removably hingeable ramp 58 has a plurality of spaced-apart, axially-aligned ramp rings 172 integrally attached at one of its long edges. When the treadmill 10 is disposed in its operative position, the ramp rings 172 of the removably hingeable ramp 58 are also placed contiguous to and in axial alignment with the lugs 56 and the cover plate insertion rings. Thus, the securing bar or rod is inserted through three different structures: the second frame lugs 56, the axially-aligned ramp rings 172, and the cover plate insertion rings.

In addition to the belt scraper to remove dirt and other debris from the belt 118 when the treadmill 10 is disposed in its operative position and the belt 118 is moving about the rollers, some type of lubrication means in the apparatus of the present invention is contemplated in order to reduce the friction between the belt 118 and the rollers. Although it is not shown in any of the aforedescribed figures, it is contemplated in the apparatus of the present invention that a selectively automatic lubrication means located within the third frame 88 and adjacent the second roller 112 will be employed to minimize friction between the belt 118 and the rollers and to increase the belt wear. The lubrication means may be some type of spray or nozzle in the third frame 88 and having nozzle or pipe openings whereby selective spraying of the desired lubricant onto the belt 118 and at least one roller is achieved. The lubricant-spraying nozzle or pipe could extend partially into the third frame 88 or it could extend across and be attached to each long side of the third frame 88. Despite these variations in configuring the automatic lubrication means, the primary purpose will be to direct a spray of lubricating liquid onto the inner surface of the belt 118 and at least one of the rollers.

Figure 8:
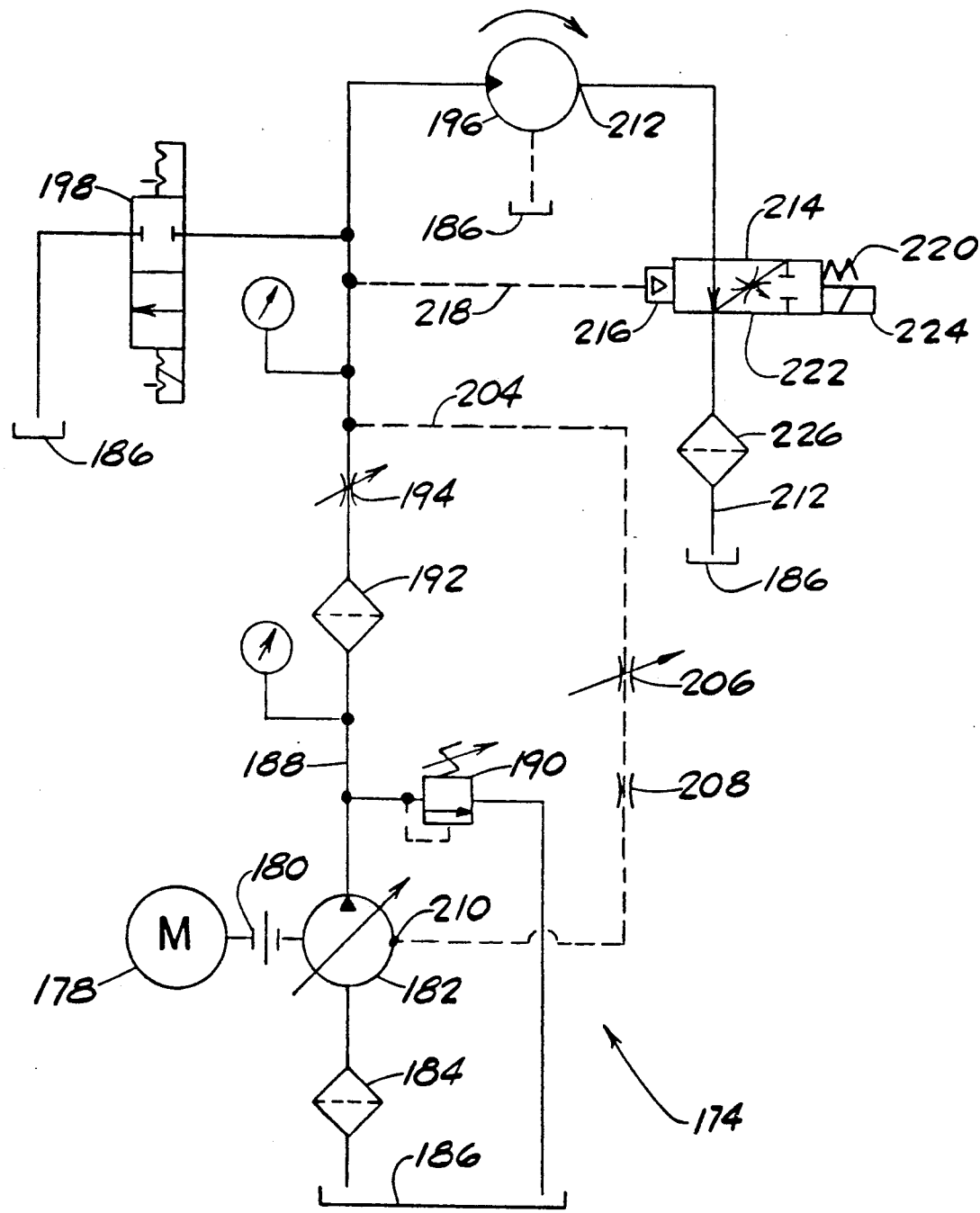
FIG. 8 is a schematic diagram of a main belt drive system for the apparatus of the present invention first shown in FIG. 1.
Figure 9:
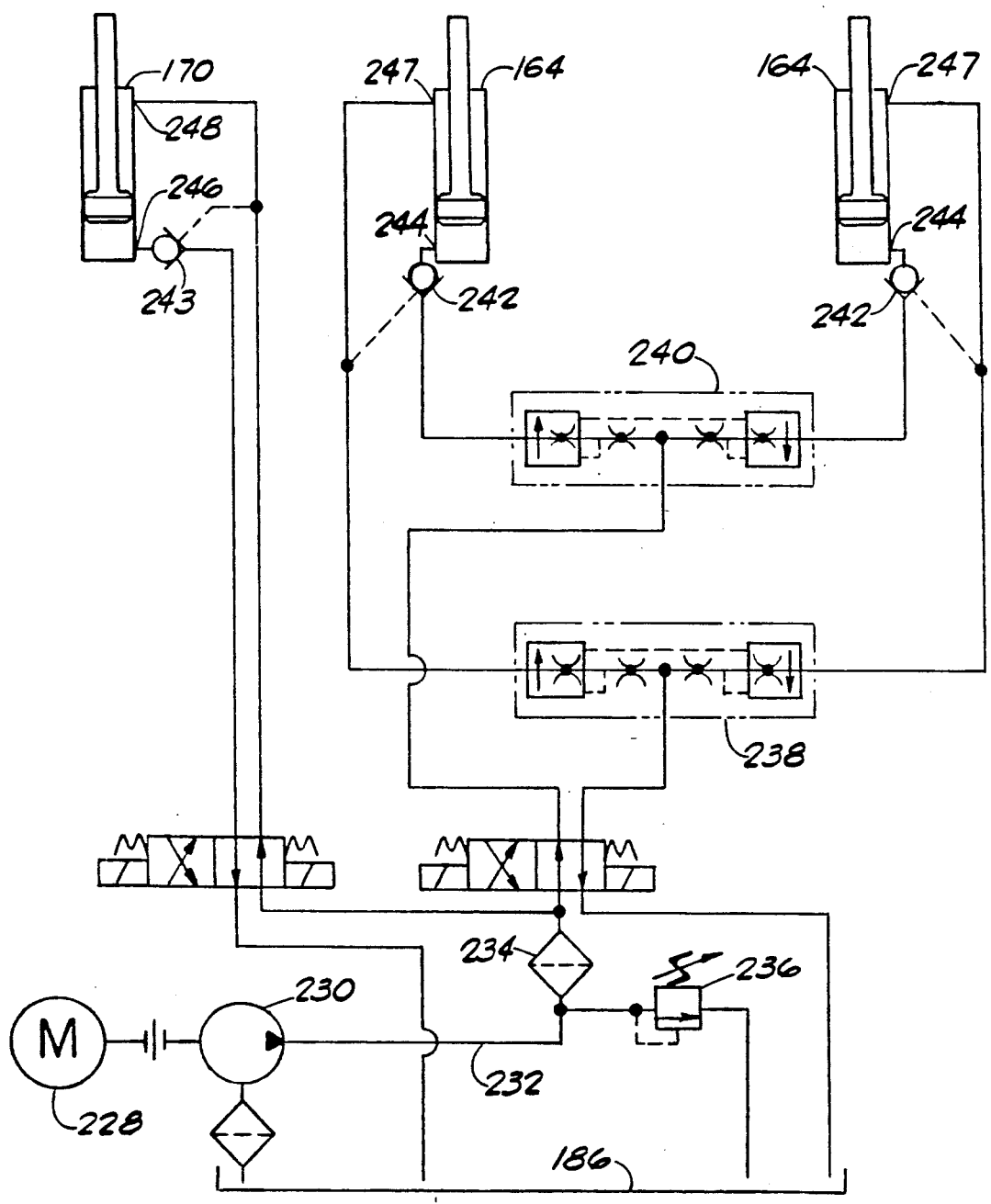
FIG. 9 is a schematic diagram of an auxiliary drive unit for the apparatus of the present invention first shown in FIG. 1.

FIGS. 8 and 9 are schematic diagrams which illustrate the various hydraulic components of the apparatus of the present invention. What follows will be a description of the significant aspects of the various hydraulic components of the treadmill 10, since some of the hydraulic components of the apparatus of the present invention are widely and commonly used in numerous industrial settings and applications. The treadmill 10 has two separate motor means, a main motor means for continuously driving the rollers, and an auxiliary motor means which provides the power for the inclining means. The main motor means comprises a belt drive system 174 and includes the automatic load sensing means and the auxiliary motor means comprises a hydraulic drive system 176. The belt drive system 174 will be described first. The prime mover in the belt drive system 174 is a standard three-phase electrical motor 178 which is attached by a mechanical coupling 180 to a variable displacement hydraulic piston pump 182. The hydraulic piston pump 182 draws fluid through a first main filter 184 from a hydraulic reservoir 186 and generates fluid flow, the fluid entering a main line 188. At this point, fluid flow exceeding a predetermined pressure is returnable to the reservoir via a main variable pressure relief valve 190 branching from the main line 188. The fluid is directed through the main line 188 where it permeates a second main filter 192 flowing through it and then encountering a variable flow control valve 194 which acts as a variable accelerator for the belt drive system 174. The pressure relief valve 190 regulates and senses pressure in the main line 188. There are also two pressure site gages in the belt drive system 174, the first gage branching off from the main line 188 immediately before the second main filter 192, and the second gage branching off the main line 188 immediately after the variable flow control valve 194. The hydraulic holding reservoir 186 has a capacity of approximately 80 to 100 gallons. Branching off from the main line 188, immediately before the fluid flow enters a bent axis hydraulic piston motor 196, is an emergency dump valve 198 which is normally closed. When the emergency stop switch on the control panel 162 is pressed, a signal will be sent that actuates the opening of the emergency dump valve 198. When this is opened, the fluid flow will be routed back to the hydraulic reservoir 186 and the hydraulic piston motor 196 as well as belt movement will immediately stop. The reset dump valve switch on the control panel 162 must then be pressed in order to reset, i.e., to reclose the emergency dump valve 198. The emergency dump valve 198 is not to be used during a training and exercise session because a sudden stop could cause injury to the quadruped. The main line 188 then attaches to the hydraulic piston motor 196, illustrated in FIG. 8 by an arrow indicating the rotational direction of the hydraulic piston motor 196 as it would be viewed from the spectator or observer side of the treadmill 10.

The hydraulic piston motor 196 is attached to the first roller 110 by a flexible rubber coupling 200, the attachment being on the left side of the drive roller 110 as viewed from the entry end 14. A hydraulic piston motor bracket 202 provides support for the securement or attachment of the hydraulic piston motor 196 to the left side of the third frame 88 as viewed from the entry end 14. In order for the hydraulic piston motor 196 to be attached to the first roller axle 152, a part of the hydraulic piston motor 96 must be inserted through the rectangular-shaped clearance window 54 which is cut out on the lengthwise side of the second frame 40. Because the hydraulic piston motor 196 is secured to the third frame 88, when the third frame 88 is pivoted upward along a longitudinal axis, the hydraulic piston motor 196 moves in tandem with the third frame 88.

In addition, in the hydraulic drive system 176, immediately following the variable flow-control, accelerator valve 194, is a branched off pilot line 204 containing another smaller second variable flow-control valve 206 and a fixed diameter flow-control valve 208. This pilot line 204 finally ends, connected to the piston pump compensator 210. This whole pilot line 204 is, therefore, used for setting the piston pump compensator 210.

Following the hydraulic piston motor 196 and located in an exhaust line flow 212 from this motor 196 is an automatically-adjusting, pilot pressure-operated, spool-type balancing valve 214. A balancing feature is created by an interplay between the pilot pressure control 216 on the valve 214, physically connected to the main line 188 of the motor 196 via a main pilot line 218 and an infinitely variable adjustable spring 220 located on the opposite side of the valve spool 222. Also located on the same side of the spool 222 with the spring 220 is an electrical solenoid control 224 which shall be hereinafter described.

During normal operation, the balancing valve 214 is fully open. If the quadruped should overdrive the belt, the main line 188 pressure would drop, pilot pressure would thus drop, and the spring 220 would extend and proportionately close the valve 214, thereby providing an automatic variable breaking effect to the motor 196. Total loss of main line 188 pressure will always fully close the balancing valve 214.

Next, the electrical solenoid 224 control of the balancing valve 214 will be discussed. If an emergency situation is noticed by the operator or spectator, actuation of the panic button 150 will set a predetermined adjustable timing circuit into action, thus closing the balance valve 214 and decelerating the belt 118 and quadruped 12 to a smooth safe stop. Thereafter, the emergency dump valve 198 must be immediately and automatically actuated in tandem to maintain a shutdown state. Next, following the balancing valve 214, the fluid flow permeates a third main filter 226 and returns freely back to the hydraulic reservoir 186.

In addition to the belt drive system 174, the apparatus of the present invention also includes a separate auxiliary drive system 176. The primary purpose of the auxiliary system 176 is to actuate the inclining means and the pivoting means, causing the second frame 40 to incline relative to the horizontal disposition of the first frame 20 via a pair of hydraulic inclining cylinders 164, or the third frame 88 to pivot with respect to the second frame 40 via a single hydraulic pivoting cylinder 170. One reason the apparatus of the present invention is divided between a belt drive system 174 and an auxiliary drive system 176 is to maintain uniform and adequate pressure throughout the main drive system 174. If there were only one drive system for the entire apparatus, when the hydraulic inclining cylinders 164 were actuated, there could be a drop in pressure of the system 174, interfering with the operation of other component parts of the system, such as any experimental valves or control conditions, thus rendering certain inaccuracies in measurement, and, perhaps resulting in sudden unexpected occurrences which might injure or harm the quadruped exercising on the belt 118.

The auxiliary drive system 176 includes a motor 228, either gasoline, electrical, or some other type, connected to an auxiliary hydraulic pump 230. The hydraulic reservoir 186 used in the belt drive system 174 will also be used by the auxiliary drive system 176. An auxiliary main line 232 extends outwardly from the pump 230 and, along its path, encounters an auxiliary filter 234 and a variably-adjustable auxiliary pressure relief valve 236. Under certain predetermined conditions, the relief valve 236 is able to direct fluid flow back to the reservoir 186. The unique component of the auxiliary drive system 176 is a pair of proportional flow divider valves 238 and 240 for selectively regulating and equalizing fluid flow into and out of the inclining means, or more specifically, the pair of hydraulic inclining cylinders 164.

There is a tendency in hydraulic cylinders to have an uneven extension or retraction when two or more hydraulic cylinders are being simultaneously moved or actuated. In such a situation, one cylinder may creep ahead while another cylinder lags behind, causing the uneven extension or retraction of the cylinders 164. In the apparatus of the present invention, the flow divider valves 238 and 240 are adapted to immediately sense, regulate, and equalize the fluid flow occurring between the cylinders 164. For example, if one cylinder 164 receives more fluid flow than the other, the flow divider valves 238 and 240 will be capable of immediately sensing this flow imbalance and will automatically open, allowing for a greater orifice in the cylinder 164 receiving the lesser amount of fluid flow and an instantaneous balancing effect will be created.

A special feature in the auxiliary drive system 176 is a pair of pilot-operated check valves 242 in flow communication with the cylinder 164. A separate check valve 243 is also in flow communication with the cylinder 170. The valves 242 permit free flow into each cap end 244 of each cylinder 164 as shown in FIG. 9. In addition, the check valve 243 permits free flow into the cap end 246 of the cylinder 170. This operation permits cap end outward flow only when actuated with pilot pressure from each rod end hydraulic line 247, thus providing a safety feature should a power failure occur. The same principle applies to the pivoting cylinder rod end 248 on the pivoting cylinder 170.

The present invention has been described and illustrated in connection with a preferred embodiment, however, it is to be understood that other modifications and variations may be resorted to without departing from the spirit and scope of the invention, as those skilled in the art will readily understand. Such modifications and variations are considered to be within the purview and scope of the invention and the appended claims.

We claim:

1. A physical exercise treadmill apparatus for the general training and exercise of quadrupeds, with particular utilization for thoroughbred racehorses, comprising:
- a tripartite frame structure having an entry end and an exit end and including a first rigid elongated frame for location on a stationary surface, a second rigid elongated frame secured on the first frame and selectively inclinable relative to the first frame, a third rigid elongated frame normally disposed within the second frame and adapted to be pivoted, along a longitudinal axis, relative to the second frame;
- first and second rollers at opposite ends of the third frame;
- an endless belt slidably supported for generally longitudinal movement about the rollers within the third frame and having a topmost belt surface disposed substantially the full length and width of the third frame;
- a main motor means for continuously driving the belt further including a belt drive system adapted for selective shutdown;
- an auxiliary motor means for selectively actuating the inclining of the second frame; and
- a load support shock-absorbing means disposed within the third frame and intermediate the rollers.

2. The apparatus of claim 1 wherein the belt drive system includes: a hydraulic piston motor rotatably engaged to the first roller and adapted for driving the first roller, a hydraulic pump in flow communication with the hydraulic piston motor, and an electrical drive motor for actuating fluid flow in the hydraulic pump.

3. The apparatus of claim 1 or 2 wherein the belt drive system further comprises an automatic load sensing means that provides a resistive, breaking effect if the quadruped overdrives the belt drive system in order to effect belt drive system shutdown.

4. The apparatus of claim 3 wherein the automatic load sensing means includes an automatically adjusting, pilot-operated, balance valve adapted for registering pressure variations within the belt drive system.

5. The apparatus of claim 4 further comprising a plurality of pilot-operated check valves for regulating fluid flow.

6. The apparatus of claim 1 further characterized by a plurality of staggered, parallel, spaced-apart idler rollers positioned transverse to the second frame and adapted for supporting thereon the slidable movement of the belt.

7. The apparatus of claim 6 further characterized by having at least one idler roller rotatably attached to the third frame.

8. The apparatus of claim 1 further comprising a pair of elongated, oppositely-disposed, vertically-extending side rails, each rail having an inner surface and an outer surface, the rails adapted to be insertably removable in the second frame and facilitating quadruped confinement to the belt.

9. The apparatus of claim 8 wherein the side rails include a pair of oppositely-disposed, removable, padded abutments, located generally adjacent front and rear of the quadruped and above the topmost belt surface, each padded abutment transversely extending between and secured to the side rails and adapted for restricting the forward-to-rearward movement of the quadruped to the topmost belt surface.

10. The apparatus of claim 9 further comprising a safety sensor means located on at least one side rail, the sensing means being adjacent the entry end or the exit end and adapted to communicate controlled decelerative belt drive system shutdown when actuated by the quadruped intersecting a signal emanating therefrom.

11. The apparatus of claim 1 wherein the first frame terminates as a pair of oppositely-disposed, integrally-formed, blunt-nosed entry frame ends and exit frame ends, the frame ends adapted for facilitating skidding and slidable movement on the stationary surface.

12. The apparatus of claim 11 wherein the first frame includes a pair of oppositely-disposed first frame pivoting blocks, adjacent the entry end and adapted for facilitating selective inclining of the second frame.

13. The apparatus of claim 1 wherein the first frame has a pair of flat, outwardly-extending flanges, each flange having a flat upper surface for substantially supporting the second frame when said frame is disposed in its substantially horizontal position.

14. The apparatus of claim 1 wherein the second frame is rectangular-shaped and is further defined by an interior second frame surface and an exterior second frame surface.

15. The apparatus of claim 14 further comprising a plurality of spaced-apart axially-aligned second frame pivoting blocks removably mountable on the interior second frame surface and adapted for facilitating the pivoting of the third frame.

16. The apparatus of claim 15 wherein each second frame pivoting block has an upper block surface further defined by an elongated recessed groove thereon.

17. The apparatus of claim 1 further comprising an inclining means for selective longitudinal inclining of the second frame relative to the horizontal disposition of the first frame.

18. The apparatus of claim 1 further comprising a pivoting means for selective pivoting of the third frame along a longitudinal axis relative to the normally horizontal disposition of the second frame.

19. The apparatus of claim 1 further comprising a plurality of spaced-apart vertical take-up members, each vertical take-up member attached to the exterior second frame surface and located adjacent and opposite the idler rollers, and adapted for adjustment of the idler rollers.

20. The apparatus of claim 1 further comprising a load cell actuating means for determining the position of the quadruped on the belt and adapted to effect controlled decerlative belt drive system shutdown when the quadruped exceeds predetermined lateral and forward-to-rearward safety limits.

21. The apparatus of claim 20 wherein the load cell actuating means includes an overload switch support adapted to permit reciprocal longitudinal traversible movement within a fixed range.

22. The apparatus of claim 21 further comprising an overload switch depending from and attached to the overload switch support, the overload switch actuating the first range end or the second range end, such actuation producing a signal for controlled decelerative shutdown of the belt drive system.

23. The apparatus of claim 22 further comprising an overhead support means for securing the overload switch support thereto.

24. The apparatus of claim 23 wherein the overhead support means includes a pivotally removably attachable vertically-extending mast securable to the second frame and having the overload switch mounted thereon.

25. The apparatus of claim 23 further comprising a connective flexible sling attached to the quadruped and to the overload switch.

26. The apparatus of claim 1 further comprising a pair of oppositely-disposed, horizontal roller take-up members, each horizontal take-up member located outboard of and secured to the third frame and positioned adjacently opposite the first roller in order to facilitate selective longitudinal positionable adjustment thereof.

27. The apparatus of claim 1 further comprising means for monitoring belt speed, belt travel distance and belt run time of the belt and the quadruped heart rate during training and exercise sessions.

28. The apparatus of claim 27 wherein the monitoring means includes a display monitor adapted for registering and translating physical characteristics of the belt and the quadruped into visually discernible indicia.

29. The apparatus of claim 1 further comprising an emergency shutdown means for stopping the belt drive system when the quadruped has exceeded lateral or forward-to-rearward safety limits on the belt.

30. The apparatus of claim 29 wherein the emergency shutdown means includes a plurality of spaced-apart panic buttons located on the first frame and adapted for effecting a controlled decelerative belt drive system shutdown when the panic buttons are selectively pressed.

31. The apparatus of claim 1 further comprising a pair of oppositely-disposed, longitudinally-extending kickplates located adjacent the topmost belt surface and adapted for deflecting the quadruped onto the belt if the quadruped should attempt to laterally overstep the belt during a training or exercise session.

32. The apparatus of claim 1 wherein the load support shock-absorbing means includes a slider impact bed for disposition within the third frame, positioned between the first roller and second roller and beneath the topmost belt surface.

33. The apparatus of claim 32 wherein the slider impact bed includes a plurality of removably insertable, adjacently aligned, rigid support pans adapted for placement within the third frame.

34. The apparatus of claim 33 wherein the load support means includes a plurality of elongated, contiguously stacked impact absorption members for layered rearrangeable placement superjacent the support pans and beneath the topmost belt surface.

35. The apparatus of claim 1 wherein the endless belt is removably mountable from the first roller, the second roller, and the idler rollers after upward pivoting of the third frame along the longitudinal axis.

36. The apparatus of claim 1 further comprising a selectively automatic lubrication means in order to minimize belt friction and increase belt wear, located within the third frame and adjacent the second roller.

37. The apparatus of claim 1 further comprising a belt speed detection means for determining rotational belt speed by registering the revolutions of the first roller during a given time unit, the roller detection means located outboard the third frame and in rotational registration with the first roller.

38. The apparatus of claim 1 further comprising an attachably-removable entry cover plate with at least one of its edges having spaced-apart, axially-aligned, cover plate insertion rings integrally attached thereto, the entry cover plate adapted for attachment at the entry end and, when disposed in its operative position, substantially covering the first roller.

39. The apparatus of claim 1 further comprising a removably hingeable ramp for attachment generally at the entry end and having a plurality of spaced-apart, axially-aligned ramp rings integrally attached to at least one edge.

40. The apparatus of claim 39 wherein the second frame includes a plurality of spaced-apart, axially-aligned, integrally-attached lugs located at the entry end, the lugs being adapted for axially contiguous placement of the ramp rings and cover plate insertion rings therebetween the lugs.

41. The apparatus of claim 1 further comprising belt wipe means for removing material from the belt in order to maintain smooth, unimpeded belt movement thereabout the first roller, the second roller, and the idler rollers.

42. The apparatus of claim 41 wherein the belt wipe means includes at least one transversely-extending belt scraper adjacent and parallel to at least one idler roller and adapted for scraping material off the belt as the belt passes therebetween the idler roller and the belt scraper.

43. The apparatus of claim 1 wherein the auxiliary motor means includes a proportional flow divider valve for selectively regulating and equalizing a fluid flow.

* * * * *